(12) United States Patent
Iida et al.

(10) Patent No.: US 9,174,368 B2
(45) Date of Patent: Nov. 3, 2015

(54) RETARDATION FILM, METHOD OF PRODUCING THE SAME AND IMAGE DISPLAY DEVICE

(75) Inventors: Toshiyuki Iida, Ibaraki (JP); Takahiro Nakai, Ibaraki (JP); Takashi Shimizu, Ibaraki (JP); Tsutomu Hani, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 347 days.

(21) Appl. No.: 12/725,581

(22) Filed: Mar. 17, 2010

(65) Prior Publication Data

US 2010/0249323 A1 Sep. 30, 2010

(30) Foreign Application Priority Data

Mar. 26, 2009 (JP) ................................. 2009-075431

(51) Int. Cl.
| | |
|---|---|
| *C09K 19/00* | (2006.01) |
| *B29C 41/28* | (2006.01) |
| *B29C 55/04* | (2006.01) |
| *C09D 163/10* | (2006.01) |
| *G02B 5/30* | (2006.01) |
| *G02F 1/13363* | (2006.01) |
| *B29C 35/08* | (2006.01) |

(Continued)

(52) U.S. Cl.
CPC ................ *B29C 41/28* (2013.01); *B29C 55/04* (2013.01); *C09D 163/10* (2013.01); *G02B 5/3083* (2013.01); *B29C 35/0805* (2013.01); *B29C 2035/0827* (2013.01); *B29K 2033/08* (2013.01); *B29K 2063/00* (2013.01); *B29K 2995/0034* (2013.01); *G02F 1/13363* (2013.01); *Y10T 428/1036* (2015.01)

(58) Field of Classification Search
CPC .......... G02F 1/13363; G02F 1/133634; G02F 2001/133631; B29K 2063/00; Y10T 428/1036; Y10T 428/1073; B29C 41/28; B29C 35/0805; B29C 55/04; B29C 55/06; B29C 55/08; G02B 5/3083; G02B 5/32; C09D 163/10
USPC .......................... 428/1.3, 1.53; 349/117, 118; 359/489.06, 489.07; 525/107, 108, 525/119; 264/479; 427/508
See application file for complete search history.

(56) References Cited

U.S. PATENT DOCUMENTS

| | | | |
|---|---|---|---|
| 2005/0286001 A1 | 12/2005 | Elman et al. | |
| 2006/0066946 A1* | 3/2006 | Liu et al. | 359/485 |
| 2008/0170294 A1* | 7/2008 | Kuroda et al. | 359/500 |

FOREIGN PATENT DOCUMENTS

| | | | |
|---|---|---|---|
| JP | 2005-156862 A | 6/2005 | |
| JP | 2006-292890 A | 10/2006 | |
| JP | 2007047498 A | * | 2/2007 |

(Continued)

OTHER PUBLICATIONS

Machine translation of JP 2007-047498, Dec. 6, 2011.*

(Continued)

*Primary Examiner* — Ruiyun Zhang
(74) *Attorney, Agent, or Firm* — Westerman, Hattori, Daniels & Adrian, LLP

(57) ABSTRACT

The retardation film of the present invention contains at least one of an epoxy resin cured product and an epoxy (meth) acrylate resin cured product. In the retardation film of the present invention, in-plane birefringence index thereof at a wavelength of 590 nm is preferably 0.001 or more and a birefringence index in a thickness direction thereof at a wavelength of 590 nm is preferably 0.001 or more.

3 Claims, 1 Drawing Sheet

(51) Int. Cl.
*B29K 33/00* (2006.01)
*B29K 63/00* (2006.01)

(56) References Cited

FOREIGN PATENT DOCUMENTS

| | | |
|---|---|---|
| JP | 2007-91941 A | 4/2007 |
| JP | 2007-328052 A | 12/2007 |
| JP | 2007-328053 A | 12/2007 |
| JP | 2008-274461 A | 11/2008 |
| JP | 2008-544304 A | 12/2008 |
| JP | 2009-042673 A | 2/2009 |
| JP | 2009-069745 A | 4/2009 |
| JP | 2010-39299 A | 2/2010 |
| WO | 2005/031409 A1 | 4/2005 |

OTHER PUBLICATIONS

Japanese Office Action dated Oct. 19, 2012, issued in coreesponding Japanese Patent Application No. 2009-075431, with Partial English translation (9 pages).

* cited by examiner

RETARDATION FILM, METHOD OF PRODUCING THE SAME AND IMAGE DISPLAY DEVICE

FIELD OF THE INVENTION

The present invention relates to a retardation film which has a high birefringence index and an excellent mechanical strength, a method of producing the same, and an image display device.

DESCRIPTION OF THE RELATED ART

A retardation film is an optical film exhibiting a predetermined retardation in an in-plane direction and/or in a thickness direction. The retardation film is incorporated in an image display device such as a liquid crystal display device for improving a viewing angle thereof. In addition, the retardation film is also referred to as a viewing angle compensation film or a birefringent film.

Such a retardation film is generally produced by a film-forming method (casting method) in which a solution formed by dissolving resin components in a solvent is coated on a substrate, or a film-forming method (melt extrusion method) in which resin components are melt-extruded. In the melt extrusion method, since precision of a thickness of the film is hardly improved and fine streaks resulting from a die tend to be produced in a film surface, it is difficult to produce optical films of high quality. On the other hand, although optical films of high quality can be produced by the casting method, a solvent, in which the resin components are dissolved, is restricted in the casting method.

Japanese Unexamined Patent Publication No. 2007-328052 and Japanese Unexamined Patent Publication No. 2007-328053 disclose a retardation film containing an urethane resin, which is obtained by a film-forming method of coating a solution formed by dissolving an urethane acrylate monomer and a polymerization initiator in an appropriate solvent onto a substrate. The urethane acrylate monomer can be dissolved in relatively many kinds of solvents since the urethane acrylate monomer has a polymerizable functional group. Therefore, the retardation film containing an urethane resin can be produced by the casting method.

However, the retardation film containing an urethane resin has a problem that exhibition of retardation is small (that is, a birefringence index is small) and a mechanical strength is low.

SUMMARY OF THE INVENTION

It is an object of the present invention to provide a retardation film which can be formed by a casting method and has a high birefringence index and an excellent mechanical strength, and an image display device including the retardation film.

It is another object of the present invention to provide a method of producing a retardation film which has a high birefringence index and an excellent mechanical strength.

A retardation film of the present invention contains at least one of an epoxy resin cured product and an epoxy (meth)acrylate resin cured product.

A preferable retardation film of the present invention contains the epoxy resin cured product as an essential component.

A preferable retardation film of the present invention has an in-plane birefringence index of 0.001 or more at a wavelength of 590 nm and a birefringence index in a thickness direction of 0.001 or more at a wavelength of 590 nm.

The retardation film of the present invention has a higher birefringence index and an excellent mechanical strength. Such a retardation film can be suitably used as constituent members for applications which are likely to reach high temperatures, such as image display devices.

Further, the retardation film of the present invention can be produced by a casting method.

In another aspect of the present invention, a method of producing a retardation film is provided.

A method of producing a retardation film of the present invention includes the step of forming a coated layer on a substrate by coating a composition containing at least one of an epoxy compound and an epoxy (meth)acrylate compound onto the substrate, and the step of forming a cured layer on the substrate by curing the coated layer by irradiating the coated layer with light.

A preferable method of producing a retardation film of the present invention further includes the steps of peeling off the cured layer from the substrate and then stretching the cured layer.

In a preferable method of producing a retardation film of the present invention, a direction of stretching of the cured layer is a uniaxial direction and a stretching ratio of the cured layer is 1.01 to 2.0 times.

In a preferable method of producing a retardation film of the present invention, the epoxy compound and the epoxy (meth)acrylate compound are non-liquid crystalline.

According to the method of producing a retardation film of the present invention, a retardation film having a high birefringence index and an excellent mechanical strength can be obtained. Further, according to the method of producing a retardation film of the present invention, it is possible to obtain a retardation film whose thickness of the film is easily controlled and whose smoothness of surface is excellent.

In another aspect of the present invention, an image display device is provided.

The image display device of the present invention comprises any of the retardation films described above.

DETAILED DESCRIPTION OF THE INVENTION

Constituents of Retardation Film

Figure 1:
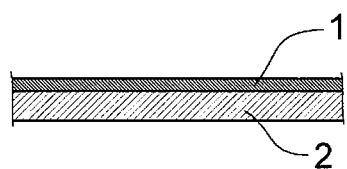
FIG. 1 is a simplified cross sectional view showing an embodiment of a retardation film of the present invention.

A retardation film of the present invention contains at least one of an epoxy resin cured product and an epoxy (meth)acrylate resin cured product. Therefore, the retardation film of the present invention contains an epoxy resin cured product or an epoxy (meth)acrylate resin cured product, or contains both of an epoxy resin cured product and an epoxy (meth)acrylate resin cured product.

In the present specification, there may be cases where "the epoxy resin cured product and the epoxy (meth)acrylate resin cured product" are collectively referred to as "an epoxy cured product".

In the present specification, the expression "A to B" means "A or more and B or less".

The epoxy resin cured product is obtained by curing an epoxy compound. The type of the epoxy compound may be any of a photocurable type, a thermosetting type, and a two-component curable type. The epoxy compound is preferably a photocurable type or a thermosetting type in that a photocurable or thermosetting epoxy compound can easily produce a retardation film by a casting method. Furthermore, the epoxy compound is preferably a photocurable type such as an ultraviolet curable type in that a retardation film having a higher birefringence index can be easily produced by a casting method and an epoxy resin cured product can be obtained in a short time.

The epoxy compound is an epoxide having at least an epoxy group in a molecule. The epoxy group has a three-membered ring composed of two carbon atoms and a carbon an oxygen atom. Examples of the epoxy group include a glycidyl group, and alicyclic epoxy groups in addition to a basic epoxy group.

The epoxy compound is not particularly limited, and examples of the epoxy compound include a bisphenol type, a brominated bisphenol type, a hydrogenated bisphenol type, a high molecular weight type, a biphenyl type, a naphthalene type, a phenol novolac type, a cresol novolac type, and a dicyclopentadiene type. Examples of the bisphenol type epoxy compound include a bisphenol A type, a bisphenol F type, and a bisphenol S type. The epoxy compounds of these types may be used singly or in combination of two or more species. As these epoxy compounds, commercialized products may be used.

In the present invention, it is preferable to use the bisphenol type epoxy compounds or/and high molecular weight type epoxy compounds since a retardation film having a higher birefringence index can be formed from these epoxy compounds.

The bisphenol type epoxy compound is a glycidyl ether-based epoxy compound prepared by a condensation reaction of bisphenols such as bisphenol A with epichlorohydrin, and condensation units of bisphenols and epichlorohydrin may be introduced repeatedly in the glycidyl ether-based epoxy compound. Examples of the high molecular weight type epoxy compound include a phenoxy type epoxy compound formed by repeatedly introducing the condensation units of bisphenols and epichlorohydrin.

The epoxy compound is preferably a compound having a plurality of epoxy groups, and more preferably a compound having epoxy groups on at least both ends of a molecule respectively.

The molecular weight (weight-average molecular weight) of the epoxy compound is not particularly limited, but the molecular weight is preferably 200 to 70000. In the present invention, it is preferable to use a bisphenol type epoxy compound having a weight-average molecular weight of 200 to 600, or a high molecular weight type epoxy compound having a weight-average molecular weight of 10000 to 50000. By using these epoxy compounds, an effect of improving flexibility and transparency of the cured product can be obtained.

The weight-average molecular weight can be measured according to a gel permeation chromatography method (polystyrene standard) by a tetrahydrofuran solvent.

Further, the epoxy equivalent of the bisphenol type epoxy compound is preferably 100 to 300 g/eq. The epoxy equivalent of the high molecular weight type epoxy compound is preferably 5000 to 25000 g/eq.

Further, the epoxy (meth)acrylate resin cured product is obtained by curing an epoxy (meth)acrylate compound. The epoxy (meth)acrylate compound is preferably photocurable type or thermosetting type for the same reason as in the epoxy resin cured product, and more preferably photocurable type.

The epoxy (meth)acrylate compound is an ester compound of an epoxy compound and a (meth)acrylic acid. The epoxy (meth)acrylate refers to epoxy acrylate or epoxy methacrylate, and the (meth)acrylic acid refers to an acrylic acid or a methacrylic acid.

The epoxy (meth)acrylate compound can be obtained, for example, by reacting the epoxy compound with a (meth)acrylic acid.

Examples of the epoxy compound of the epoxy (meth)acrylate compound include various epoxy compounds exemplified in the above paragraph of the epoxy resin cured product. Among them, a bisphenol type epoxy compound is preferable as the epoxy compound of the epoxy (meth)acrylate compound.

The molecular weight (weight-average molecular weight) of the epoxy (meth)acrylate compound is not particularly limited, but the molecular weight is preferably 300 to 700. By using an epoxy (meth)acrylate compound having a weight-average molecular weight of 300 to 700, an effect of improving flexibility and transparency of the cured product can be obtained.

Both the epoxy compound and the epoxy (meth)acrylate compound are preferably non-liquid crystalline. As exemplified above, the epoxy compounds such as a bisphenol type, a brominated bisphenol type, a hydrogenated bisphenol type, a high molecular weight type, a biphenyl type, a naphthalene type, a phenol novolac type, a cresol novolac type, and a dicyclopentadiene type are all non-liquid crystalline. The epoxy (meth)acrylate compound produced by reacting the epoxy compound with a (meth)acrylic acid is also non-liquid crystalline.

A retardation film containing a non-liquid crystalline epoxy compound and/or a non-liquid crystalline epoxy (meth)acrylate compound does not cause a reduction in contrast of an image display device in mounting the film on the image display device. Since a liquid crystalline compound produces fluctuations resulting from movements of molecules of the compound and thereby, polarized light is slightly resolved, the liquid crystalline compound causes a reduction in contrast of an image display device. On the other hand, since the non-liquid crystalline compound does not produce the fluctuations described above, if this compound is used, a retardation film, which does not cause a reduction in contrast of an image display device, can be obtained.

A non-liquid crystallinity refers to a property in which, even if the temperature or the concentration of a solution obtained by dissolving the compound in a solvent is changed, phase transition between an isotropic phase and a liquid crystal phase does not occur.

A retardation film of the present invention is only required to contain at least one of the epoxy resin cured product and the epoxy (meth)acrylate resin cured product. However, a retardation film containing only the epoxy resin cured product as a resin component has a higher birefringence index than a retardation film containing only the epoxy (meth)acrylate resin cured product. Particularly, a retardation film containing a cured product of a bisphenol type epoxy compound (bisphenol type epoxy resin cured product) as a resin component has a higher birefringence index.

Accordingly, the retardation film of the present invention preferably contains the epoxy resin cured product as an essential component, and more preferably contains only the epoxy resin cured product.

When the retardation film of the present invention contains both of the epoxy resin cured product and the epoxy (meth)

acrylate resin cured product as a resin component, the content ratio of the both are not particularly limited, but it is preferable that the epoxy resin cured product is contained in a larger amount by mass than the epoxy (meth)acrylate resin cured product. The reason for the above is that a retardation film having a higher birefringence index can be obtained.

The retardation film of the present invention may contain other resin components at a content within the range in which the effects of the present invention are not impaired.

The other resin components are resin components excluding the epoxy resin cured product and the epoxy (meth)acrylate resin cured product (epoxy cured product). Examples of the other resin components include thermoplastic resins such as acrylic-based resin and vinyl alcohol-based resin. The other resin components may be cross-linked with the epoxy cured product, but they do not have to be cross-linked with the epoxy cured product.

When the other resin components are contained, they are preferably contained in a smaller amount than the epoxy cured product. If the amount of the other resin components is too large, the amount of the epoxy cured product becomes relatively small and there is a possibility that a retardation film which has a high birefringence index and an excellent mechanical strength cannot be constructed.

From such a viewpoint, the content ratio of the other resin components is preferably 0 to 5 parts by mass, and more preferably 0 to 3 parts by mass with respect to 100 parts by mass of the epoxy cured product.

Furthermore, when the epoxy compound and the epoxy (meth)acrylate compound are photocurable type, the retardation film preferably further contains a photopolymerization initiator, and more preferably further contains a photopolymerization initiator and a sensitizer.

The photopolymerization initiator is not particularly limited as long as it has an action capable of initiating polymerization (cross-linking) of the epoxy compound or the epoxy (meth)acrylate compound, and publicly known photopolymerization initiators can be used. Examples of typical photopolymerization initiators include a radical polymerization initiator to cause radical polymerization and a cationic polymerization initiator to cause cationic polymerization.

Examples of the radical polymerization initiator include α-aminoketones such as 2-methyl-1-(4-methylthiophenyl)-2-morpholinopropan-1-one; α-aminoalkylphenones such as 2-benzyl-2-dimethylamino-1-(4-morpholinophenyl)-butan-1-one; α-hydroxyalkylphenones such as 2-dimethoxy-1,2-diphenylethan-1-one; organic peroxides such as hydroperoxides; and the like.

Examples of the cationic polymerization initiator include antimony-based or aromatic sulfonium salts, antimony-based or aromatic phosphonium salts, antimony-based or aromatic ammonium salts, antimony-based or aromatic iodonium salts, and antimony-based or aromatic diazonium salts.

Examples of the sensitizer include xanthenes, cyanines, merocyanines, and acridines.

The retardation film of the present invention may contain any appropriate additive as required such as an antistat, a light stabilizer, an UV absorber, an antioxidant, a heat stabilizer, a lubricant, a bulking agent, and the like.

[Various Characteristics of Retardation Film]

The retardation film of the present invention exhibits a birefringent property in a visible light region (a wavelength of 380 nm to 780 nm).

The in-plane birefringence index ($\Delta n_{xy}$ [590]) of the retardation film of the present invention at a wavelength of 590 nm is 0.001 or more, preferably 0.0015 or more, and more preferably 0.002 or more. The birefringence index ($\Delta n_{xz}$ [590]) in a thickness direction of the retardation film is 0.001 or more, preferably 0.0015 or more, and more preferably 0.002 or more.

The index ellipsoid of the retardation film of the present invention satisfies one of the relationships of nx>ny>nz, nx>nz>ny, and nx>ny=nz.

The retardation film of the present invention is excellent in mechanical strength since the retardation film contains the epoxy cured product. The retardation film also has relatively high birefringence index since the retardation film contains the epoxy cured product which has aromatic ring (and/or alicyclic group).

The thickness of the retardation film of the present invention is not particularly limited, but the thickness is preferably 10 μm to 100 μm.

The in-plane retardation value (Re[590]) of the retardation film of the present invention at a wavelength of 590 nm is preferably 20 nm to 300 nm, and the retardation value (Rth [590]) in a thickness direction thereof is preferably 20 nm to 300 nm. By setting the thickness of the retardation film properly, the retardation film having the retardation value within the above range can be obtained.

The Nz coefficient of the retardation film is preferably 0 to 10.

The retardation film of the present invention is excellent in transparency, and the transmittance (T[550]) thereof is preferably 90% or more and more preferably 92% or more.

The above "nx" represents refractive index in the direction in which in-plane refractive index of a retardation film is maximum (X axial direction), the "ny" represents refractive index in the direction orthogonal to the X axial direction in the same plane (Y axial direction), and the "nz" represents refractive index in the direction orthogonal to the X axial direction and Y axial direction (thickness direction). Here, nx≥ny.

The "in-plane birefringence index ($\Delta n_{xy}$ [590]) at a wavelength of 590 nm" described above is a birefringence index in a plane of the retardation film, which is measured at 23° C. with light at a wavelength of 590 nm. The $\Delta n_{xy}$ [590] can be determined from the expression: $\Delta n_{xy}$ [590]=nx−ny.

The "birefringence index ($\Delta n_{xz}$ [590]) in a thickness direction at a wavelength of 590 nm" described above is a birefringence index in a thickness direction of the retardation film, which is measured at 23° C. with light at a wavelength of 590 nm. The $\Delta n_{xz}$ [590] can be determined from the expression: $\Delta n_{xz}$ [590]=nx−nz.

The "in-plane retardation value (Re[590])" described above is a retardation value in a plane of the retardation film, which is measured at 23° C. with light at a wavelength of 590 nm. When taking thickness of the retardation film to be measured as d(nm), the Re[590] can be determined from the expression: Re[590]=(nx−ny)×d.

The "retardation value in a thickness direction" described above is a retardation value in a thickness direction of the retardation film, which is measured at 23° C. with light at a wavelength of 590 nm. When taking thickness of the retardation film to be measured as d(nm), the Rth[590] can be determined from the expression: Rth[590]=(nx−nz)×d.

These values can be measured, for example, by using a retardation measuring apparatus (trade name "KOBRA-WPR" manufactured by Oji Scientific Instruments).

The "Nz coefficient" described above is a value calculated by Rth[590]/Re[590]. The "transmittance (T[550])" described above is a light transmittance of the retardation film, which is measured at 23° C. with light at a wavelength of 550 nm. The transmittance is, for example, measured by a spectrophotometer (trade name "U-4100 type" manufactured by Hitachi, Ltd.).

[Production Method of Retardation Film]

The retardation film of the present invention can be produced, for example, by undergoing the following step A and step B, and step B may be followed by the following step C and step D.

Step A: A step of forming a coated layer on a substrate by coating a composition containing at least one of an epoxy compound and an epoxy (meth)acrylate compound onto the substrate.

Step B: A step of forming a cured layer on the substrate by curing the coated layer formed in step A by irradiating the coated layer with light.

Step C: A step of stretching the cured layer.

Step D: A step of cleaning and drying the cured layer after stretching.

(Step A)

In step A, a composition containing at least one of the epoxy compound and the epoxy (meth)acrylate compound is prepared. Preferably, the composition contains the epoxy compound as an essential component. When the epoxy compound and the epoxy (meth)acrylate compound are photocurable type, a photopolymerization initiator is further mixed to prepare a composition. Generally, the photopolymerization initiator may be added in an amount of about 0.1 to 5 parts by mass with respect to 100 parts by mass of the epoxy compound.

Examples of the epoxy compound, the epoxy (meth)acrylate compound, and the photopolymerization initiator include various compounds exemplified in the above paragraph of the retardation film. Among them, non-liquid crystalline epoxy compounds and non-liquid crystalline epoxy (meth)acrylate compounds are preferably used.

In addition, the above-described other resin components and additives may be mixed as required in preparing the composition.

The obtained composition is a liquid having a moderate viscosity (0.1 to 50 Pa·s at 25° C.) which is suitable for coating, and the composition can be coated on the substrate as it is. However, when the viscosity of the composition is high and there is a possibility of interference with the coating of the composition, a solvent may be added to the composition.

Examples of the solvent include ketones such as cyclopentanone, cyclohexane, and ethyl methyl ketone; aromatic hydrocarbons such as toluene; ethers such as methyl cellosolve; esters such as acetic ester; and the like.

A coated layer can be formed on a substrate by coating the composition onto a surface of the substrate.

The substrate is used for developing the composition in the form of a liquid uniformly. The kind of the substrate is not particularly limited as long as it is suitable for this object, and for example, a synthetic resin film (the film includes a material which is referred to as a sheet) and a glass plate can be used.

In an embodiment, the substrate is a synthetic resin film. In another embodiment, the substrate is a film having an orientation layer on its surface.

The thickness of the substrate is not particularly limited, for example, the thickness thereof is 30 μm to 200 μm.

The synthetic resin film is not particularly limited, but the synthetic resin film is preferably excellent in transparency (for example, having a haze value of 5% or less).

Specific examples of the synthetic resin film include cellulose-based film such as triacetylcellulose, polyester-based film such as polyethylene terephthalate and polyethylene naphthalate, polycarbonate-based film, polyamide-based film, polynorbornene-based film, polyvinyl alcohol-based film, polyolefin-based film, acryl-based film, and the like.

When the substrate has an orientation layer, the orientation layer can be formed by performing an orientation treatment on a surface of the film. Examples of the orientation treatment include a mechanical orientation treatment such as a rubbing treatment, a chemical orientation treatment such as an optical orientation treatment, and the like.

As a method of coating the composition in the form of a liquid on the surface of the substrate, a coating method which uses proper coater may be adopted, for example. Examples of the coater include a bar coater, a reverse roll coater, a positive rotation roll coater, a gravure coater, a rod coater, a slot die coater, a slot orifice coater, a curtain coater, a fountain coater, and the like.

The coated layer made from the composition is formed on the surface of the substrate after coating of the composition.

(Step B)

In step B, the coated layer is cured by being irradiated with light.

Since the epoxy compound and/or the epoxy (meth)acrylate compound contained in the coated layer are not polymerized (are not cross-linked), the coated layer is irradiated with light in order to polymerize these compounds.

In addition, when the composition in the form of a liquid contains a solvent, it is preferable to evaporate the solvent prior to light irradiation.

The light is not particularly limited as long as it can activate the photopolymerization initiator, but ultraviolet rays are generally used as the light.

The irradiation intensity of the ultraviolet rays is preferably 100 to 1000 mJ/cm$^2$ and more preferably 200 to 800 mJ/cm$^2$.

Examples of an ultraviolet generator include a mercury lamp, a carbon arc lamp, a metal halide lamp, and a xenon lamp.

By irradiating the coated layer with ultraviolet rays, the epoxy compound and/or the epoxy (meth)acrylate compound contained in the coated layer are polymerized and these compounds are changed to an epoxy resin cured product and/or an epoxy (meth)acrylate resin cured product. Therefore, a cured layer containing the epoxy cured product is formed on a surface of the substrate.

(Step C)

In step C, the cured layer prepared in step B is stretched.

The cured layer may be stretched in a state of being laminated on the substrate (that is, a laminate of the substrate and the cured layer may be stretched). The cured layer may be stretched after being peeled off from the substrate.

It is preferable to peel off the cured layer from the substrate and stretch the cured layer.

By stretching only the cured layer in this manner, stretching of the cured layer is not restricted by a birefringent property or a stretching property of the substrate and therefore a retardation film having a relatively high birefringence index can be obtained.

Examples of stretching method include a method of uniaxially stretching a film in a width direction, a method of uniaxially stretching a film in a longitudinal direction, a method of biaxially stretching a film simultaneously in longitudinal and width directions, and a method of biaxially stretching a film successively in a longitudinal direction and in a width direction.

As a stretching treatment, it is preferable to stretch the cured layer in a uniaxial direction.

By stretching the cured layer in a uniaxial direction, the epoxy cured product contained in the cured layer is oriented in a predetermined direction. Therefore, it is possible to exhibit a large retardation in the cured layer.

The stretching ratio is not particularly limited, but the stretching ratio is preferably 1.01 times or more and more preferably 1.05 times or more, since the epoxy cured product is not oriented if the ratio is too small. On the other hand, since a stretching treatment has a limitation, the stretching ratio is preferably 2.0 times or less.

The cured layer obtained by the stretching treatment is the retardation film of the present invention.

(Step D)

In step D, a surface of the cured layer is cleaned and dried.

Step D is performed as required in order to remove the dust or the like adhered to the cured layer.

For example, the cured layer (retardation film) after stretching is cleaned with water or a cleaning solution and then dried.

In addition, the method of producing a retardation film of the present invention may have another step in addition to steps A to D.

Since the method of producing a retardation film of the present invention is the so-called casting method, thickness of the film can be easily controlled and no fine streaks are produced on a surface of the film.

Accordingly, in accordance with the production method of the present invention, a retardation film, which has a high birefringence index and an excellent mechanical strength and which has a uniform thickness and a smooth surface, can be obtained.

[Examples of Use of Retardation Film]

The retardation film of the present invention can be used singly. Further, the retardation film of the present invention can also be used in a state of being laminated on another film.

As shown in FIG. 1, an optical film of an embodiment has a retardation film 1 of the present invention and a protection film 2 laminated on one surface of the retardation film 1.

Further, an optical film of another embodiment has the retardation film of the present invention and a polarizing film laminated on one surface of the retardation film.

Figure 2:
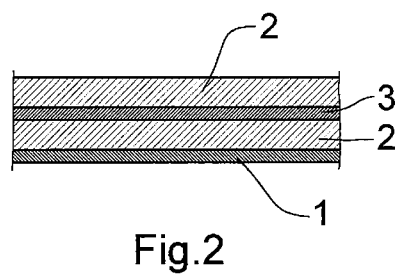
FIG. 2 is a simplified cross sectional view showing another embodiment of a retardation film of the present invention.
Figure 3:
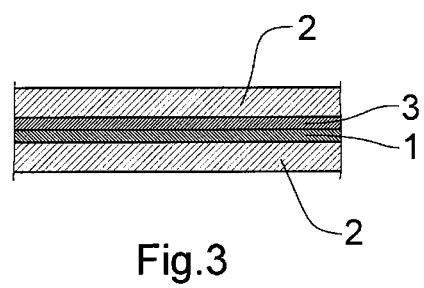
FIG. 3 is a simplified cross sectional view showing another embodiment of a retardation film of the present invention.

In this optical film, as shown in FIG. 2, the protection films 2 are laminated on both sides of a polarizing film 3, and the retardation film 1 of the present invention may be laminated on one surface of one of the protection films 2. Alternatively, this optical film, as shown in FIG. 3, may have a constitution in which the retardation film 1 of the present invention and the polarizing film 3 are laminated each other, and one of the protection films 2 is laminated on the other surface of the retardation film 1, and the other protection film 2 is laminated on the other surface of the polarizing film 3.

The polarizing film is a film having a function of transmitting a specific linearly polarized light from natural light or a polarized light. The polarized film is not particularly limited, for example, a stretched polymer film containing a dichroism pigment, a liquid crystalline film, and the like may be used.

As the protection film, a film having excellent transparency is preferably used. Typical examples of the protection film include a triacetyl cellulose-based film.

In addition, the substrate used in producing the retardation film of the present invention can be used as the protection film.

The retardation film of the present invention or the optical film laminating the other film on the retardation film is preferably mounted on an image display device.

Examples of the image display device having the retardation film or the optical film of the present invention include a liquid crystal display device, an organic EL display, a plasma display, and the like. The preferable use of the image display device is a TV set.

EXAMPLES

The present invention will be described in more detail by way of Examples and Comparative Examples. Here, the present invention is not limited to the following Examples. Measuring methods and materials which are used in the Examples and Comparative Examples are as follows.

[Measuring Method of Thickness of Film]

The thickness of a film was measured by using a digital gauge (trade name "PEACOCK" manufactured by OZAKI MFG. Co., Ltd.).

[Measuring Method of $\Delta n_{xy}$ of Retardation Film]

The in-plane retardation value (Re[590]) of a retardation film was measured at 23° C. with light at a wavelength of 590 nm, by using a retardation measuring apparatus (trade name "KOBRA-WPR" manufactured by Oji Scientific Instruments).

The retardation value (Rth[590]) in a thickness direction was determined by measuring a retardation value (R40[590]) in a direction of 40 degrees by using the retardation measuring apparatus and converting this retardation value (R40[590]) to Rth. The retardation value (R40[590]) in a direction of 40 degrees was measured by shedding light at a wavelength of 590 nm on the retardation film from a direction tilted 40 degrees from a normal of the retardation film.

The in-plane birefringence index ($\Delta n_{xy}$ [590]) of the retardation film was determined by substituting the in-plane retardation value (Re[590]) into the expression: Re[590]/d.

The birefringence index ($\Delta n_{xz}$ [590]) in a thickness direction of the retardation film was determined by substituting the retardation value (Rth[590]) in a thickness direction into the expression: Rth[590]/d. The d represents a thickness (nm) of a retardation film.

[Materials Used]

(1) Epoxy compound A: Trade name "JER-806" manufactured by Japan Epoxy Resins Co., Ltd. An epoxy compound of a bisphenol F type having a weight-average molecular weight of 284.3 and an epoxy equivalent of 160 to 170.

(2) Epoxy compound B: Trade name "YX8100BH30" manufactured by Japan Epoxy Resins Co., Ltd. An epoxy compound of a high molecular weight type (phenoxy type) having a weight-average molecular weight of 38000.

(3) Epoxy compound C: Trade name "YX6954BH30" manufactured by Japan Epoxy Resins Co., Ltd. An epoxy compound of a high molecular weight type (phenoxy type) having a weight-average molecular weight of 39000 and an epoxy equivalent of 10000 to 16000.

(4) Epoxy acrylate compound D: Trade name "NEOPOL 8328" manufactured by Japan U-Pica Co., Ltd. An epoxy acrylate compound formed from a bisphenol type epoxy compound and an acrylic acid, which has a weight-average molecular weight of 484.5.

(5) Epoxy acrylate compound E: Trade name "NEOPOL 8313" manufactured by Japan U-Pica Co., Ltd. An epoxy acrylate compound formed from a bisphenol type epoxy compound and an acrylic acid, which has a weight-average molecular weight of 394.4.

(6) Urethane acrylate F: Trade name "U-PICA 8975" manufactured by Japan U-Pica Co., Ltd.

(7) Urethane acrylate G: Trade name "U-PICA 8976" manufactured by Japan U-Pica Co., Ltd.

(8) Photopolymerization initiator H: Trade name "CPI-101" manufactured by San-Apro Ltd. A cationic polymerization initiator of an antimony-based sulfonium salt.

(9) Photopolymerization initiator I: Trade name "IRGACURE 907" manufactured by Nagase & Company, Ltd. A radical polymerization initiator of an α-aminoketone type.

(10) Substrate J: A triacetyl cellulose film having a thickness of 80 μm.
(11) Methylmethacrylate: Trade name "PARAPET" manufactured by KURARAY Co., Ltd.

Example 1

First, 20 g of the above epoxy compound A and 0.6 g of the photopolymerization initiator H were mixed, and this mixture was put in a centrifugal separator, mixed and deaerated. The mixture was in liquid form which is suitable for coating. By coating the mixture onto a surface of the substrate J using an applicator, a coated layer was formed on the substrate. Next, the coated layer was irradiated with ultraviolet rays (irradiation intensity: 300 mJ/cm$^2$) with a conveyor type ultraviolet irradiation apparatus to be cured. The resulting cured layer was peeled off from the substrate J, and the peeled cured layer (film) was uniaxially stretched by 1.1 times at 130° C., by using a batch type biaxial stretching machine. In addition, a direction of uniaxial stretching was set in parallel with a direction of coating of the mixture. The stretched film was a retardation film of Example 1.

The thickness and various physical properties of the retardation film of Example 1 are shown in table 1.

Example 2

First, 20 g of the epoxy compound B and 0.18 g of the photopolymerization initiator H were mixed, and this mixture was put in a centrifugal separator, mixed and deaerated. An organic solvent (mixed solvent of methyl ethyl ketone and cyclohexanone) was added to the mixture. The mixture with the organic solvent was in liquid form which is suitable for coating. By coating the mixture onto a surface of the substrate J using an applicator in the same manner as in Example 1, a coated layer was formed on the substrate J. This coated layer was put in a drying oven, and dried at 80° C. for 5 minutes and further dried at 150° C. for 15 minutes. Next, the coated layer after drying was irradiated with ultraviolet rays (irradiation intensity: 300 mJ/cm$^2$) with a conveyor type ultraviolet irradiation apparatus to be cured. The resulting cured layer was peeled off from the substrate J, and the peeled cured layer (film) was uniaxially stretched by 1.1 times at 130° C., by using a batch type biaxial stretching machine. In addition, a direction of uniaxial stretching was set in parallel with a direction of coating of the mixture. The stretched film was a retardation film of Example 2.

The thickness and various physical properties of the retardation film of Example 2 are shown in table 1.

Example 3

A retardation film was prepared in the same manner as in Example 2 except for using the epoxy compound C in place of the epoxy compound B.

The thickness and various physical properties of the retardation film of Example 3 are shown in table 1.

Example 4

A retardation film was prepared in the same manner as in Example 1 except for using the epoxy acrylate compound D and the photopolymerization initiator I in place of the epoxy compound A and the photopolymerization initiator H.

The thickness and various physical properties of the retardation film of Example 4 are shown in table 1.

Example 5

A retardation film was prepared in the same manner as in Example 1 except for using the epoxy acrylate compound E and the photopolymerization initiator I in place of the epoxy compound A and the photopolymerization initiator H.

TABLE 1

| | Resin Component | thickness (μm) | Re[590] (nm) | Rth[590] (nm) | $\Delta n_{xy}$ | $\Delta n_{xz}$ |
|---|---|---|---|---|---|---|
| Example 1 | Bis type epoxy compound | 30 | 142.3 | 153.3 | 0.0047 | 0.0051 |
| Example 2 | High molecular weight type epoxy compound | 14 | 48.3 | 48.9 | 0.0035 | 0.0035 |
| Example 3 | High molecular weight type epoxy compound | 15 | 32.9 | 50.5 | 0.0022 | 0.0034 |
| Example 4 | Epoxy acrylate | 50 | 113.4 | 106.6 | 0.0023 | 0.0021 |
| Example 5 | Epoxy acrylate | 48 | 76.3 | 79.5 | 0.0016 | 0.0017 |
| Comparative Example 1 | Urethane acrylate | 40 | 3.8 | 5.5 | 0.0001 | 0.0001 |
| Comparative Example 2 | Urethane acrylate | 42 | 5.6 | 4.9 | 0.0001 | 0.0001 |
| Comparative Example 3 | Methylmethacrylate | 30 | — | — | — | — |
| Comparative Example 4 | Methylmethacrylate | 30 | — | — | — | — |

The thickness and various physical properties of the retardation film of Example 5 are shown in table 1.

Comparative Example 1

First, 20 g of the urethane acrylate F and 0.6 g of the photopolymerization initiator I were mixed, and this mixture was put in a centrifugal separator, mixed and deaerated. The mixture was in liquid form which is suitable for coating. By coating the mixture onto a surface of the substrate J using an applicator, a coated layer was formed on the substrate. Next, the coated layer was irradiated with ultraviolet rays (irradiation intensity: 300 mJ/cm$^2$) with a conveyor type ultraviolet irradiation apparatus to be cured. The laminate of the cured layer and the substrate J was uniaxially stretched by 1.1 times at 140° C., by using a batch type biaxial stretching machine. In addition, a direction of uniaxial stretching was set in parallel with a direction of coating of the mixture. After stretching, the cured layer was peeled off from the substrate J. The cured layer (film) which was peeled off from the substrate J was a retardation film of Comparative Example 1.

The thickness and various physical properties of the retardation film of Comparative Example 1 are shown in table 1.

Comparative Example 2

A retardation film was prepared in the same manner as in Comparative Example 1 except for using the urethane acrylate G in place of the urethane acrylate F.

The thickness and various physical properties of the retardation film of Comparative Example 2 are shown in table 1.

Comparative Example 3

A cured layer was formed on the substrate J in the same manner as in Example 1 except for using the methyl methacrylate and the photopolymerization initiator I in place of the epoxy compound A and the photopolymerization initiator H. The cured layer was tried to be peeled off from the substrate J, but the cured layer was very brittle and therefore could not be peeled off. Therefore, Re[590] and the like of the film of Comparative Example 3 could not be measured.

Comparative Example 4

A cured layer was formed on the substrate J in the same manner as in Example 1 except for using the methyl methacrylate and the photopolymerization initiator I in place of the epoxy compound A and the photopolymerization initiator H. The cured layer was tried to be peeled off from the substrate J, but the cured layer was very brittle and therefore could not be peeled off. Therefore, Re[590] and the like of the film of Comparative Example 4 could not be measured.

[Evaluation]

The retardation films of Examples 1 to 5 had higher $\Delta n_{xy}$ [590] and $\Delta n_{xz}$ [590] than those of the retardation films of the Comparative Examples. Particularly, $\Delta n_{xy}$ [590] and $\Delta n_{xz}$ [590] of the retardation films (retardation films containing an epoxy resin cured product) of Examples 1 to 3 were higher.

Further, in Comparative Examples 1 and 2, the cured layer (film) could be peeled off from the substrate, but break of the cured layer was produced partially in peeling the cured layer. On the other hand, in Examples 1 to 5, the cured layer (film) was not damaged in peeling off the cured layer from the substrate, and the peeled cured layer was stretched well to obtain a retardation film. Therefore, the retardation films of Examples 1 to 5 are superior in mechanical strength.

INDUSTRIAL APPLICABILITY

The retardation film of the present invention can be used for image display devices such as a liquid crystal display device, and an optical lens.

What is claimed is:

1. A retardation film comprising:
   only one type of a resin component,
   wherein the only one type of resin component is either an epoxy resin cured product or an epoxy (meth)acrylate resin cured product,
   wherein an in-plane birefringence index of the retardation film at a wavelength of 590 nm is 0.001 or more and a birefringence index in a thickness direction thereof at a wavelength of 590 nm is 0.001 or more,
   the retardation film is a stretched film, and
   an index ellipsoid of the retardation film satisfies one of the relationships of nx>ny>nz, nx>nz>ny, or nx>ny=nz, wherein nx represents refractive index in the direction in which in-plane refractive index of the retardation film is maximum (X axial direction), ny represents refractive index in the direction orthogonal to the X axial direction in the same plane (Y axial direction), and nz represents refractive index in the direction orthogonal to the X axial direction and Y axial direction (thickness direction), and
   the in-plane birefringence index is determined from the expression: $\Delta n_{xy}$ [590]=nx−ny, and the birefringence index in the thickness direction is determined from the expression: $\Delta n_{xz}$ [590]=nx−nz.

2. The retardation film according to claim 1, wherein the resin component is the epoxy resin cured product.

3. An image display device having the retardation film according to claim 1.

* * * * *